United States Patent
Cho

(10) Patent No.: US 9,835,309 B2
(45) Date of Patent: Dec. 5, 2017

(54) LIGHT EMITTING DEVICE MODULE INCLUDING LENS WITH PATTERNED PROTRUSION

(71) Applicant: LG INNOTEK CO., LTD., Seoul (KR)

(72) Inventor: Sung Wook Cho, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 255 days.

(21) Appl. No.: 14/875,389

(22) Filed: Oct. 5, 2015

(65) Prior Publication Data
US 2016/0161084 A1 Jun. 9, 2016

(30) Foreign Application Priority Data

Dec. 9, 2014 (KR) .................... 10-2014-0175526

(51) Int. Cl.
| | | |
|---|---|---|
| *F21V 5/04* | (2006.01) | |
| *G02B 3/08* | (2006.01) | |
| *F21V 5/08* | (2006.01) | |
| *G02B 19/00* | (2006.01) | |
| *F21Y 115/10* | (2016.01) | |

(52) U.S. Cl.
CPC ................ *F21V 5/08* (2013.01); *F21V 5/045* (2013.01); *G02B 19/0028* (2013.01); *G02B 19/0061* (2013.01); *F21V 5/04* (2013.01); *F21Y 2115/10* (2016.08)

(58) Field of Classification Search
CPC .......... F21V 5/002; F21V 5/004; F21V 5/005; F21V 5/02; F21V 5/045; F21V 5/08; G02B 2003/0093; G02B 3/08
See application file for complete search history.

(56) References Cited

U.S. PATENT DOCUMENTS

| 7,352,011 | B2 | 4/2008 | Smits et al. | |
|---|---|---|---|---|
| 8,500,309 | B2* | 8/2013 | Chang ..................... | F21V 5/045 |
| | | | | 362/311.02 |
| 8,628,222 | B2* | 1/2014 | Kelley ..................... | F21V 5/04 |
| | | | | 362/311.06 |
| 9,052,086 | B2* | 6/2015 | Broughton ............... | F21V 5/04 |
| 9,689,554 | B1* | 6/2017 | Householder ........... | F21V 5/045 |
| 2010/0014290 | A1* | 1/2010 | Wilcox ..................... | F21V 5/04 |
| | | | | 362/311.09 |
| 2012/0287649 | A1 | 11/2012 | Kelley | |
| 2012/0307495 | A1* | 12/2012 | Shih .......................... | F21V 5/04 |
| | | | | 362/311.02 |

(Continued)

FOREIGN PATENT DOCUMENTS

| EP | 2 711 615 A1 | 3/2014 | |
|---|---|---|---|
| KR | 10-2012-0078878 A | 7/2012 | |
| NL | WO 2015110392 A1 * | 7/2015 | ............. F21V 5/045 |

*Primary Examiner* — Ismael Negron
(74) *Attorney, Agent, or Firm* — Birch, Stewart, Kolasch & Birch, LLP

(57) ABSTRACT

A lens including a first body having a first cavity, a second body in surface contact with the first body, a plurality of protrusions disposed on the surface of the second body and overlapping the first body in the vertical direction, and a plurality of patterns formed on the surface of the protrusion closest to the first body. At least one of the patterns includes a first inclined part formed in a first direction and a second inclined part formed in a second direction opposite the first direction.

20 Claims, 8 Drawing Sheets

(56) References Cited

U.S. PATENT DOCUMENTS

2016/0298820 A1* 10/2016 Deely ................... F21V 5/045
2017/0023206 A1* 1/2017 Tsai ...................... F21V 5/045
2017/0074483 A1* 3/2017 Yu ......................... F21V 5/045

* cited by examiner

LIGHT EMITTING DEVICE MODULE INCLUDING LENS WITH PATTERNED PROTRUSION

CROSS REFERENCE TO RELATED APPLICATION

This application claims priority under 35 U.S.C. §119 to Korean Patent Application No 10-2014-0175526, filed in Korea on Dec. 9, 2014, which is hereby incorporated in its entirety by reference as if fully set forth herein.

TECHNICAL FIELD

Embodiments relate to a lens and a light emitting device module including the same.

BACKGROUND

Group III-V compound semiconductors, such as GaN and AlGaN, have many advantages, such as wide and easily controllable band gap energy, and are thus widely used for optoelectronics and electronics.

In particular, light emitting devices, such as light emitting diodes or laser diodes, which use group III-V or II-VI compound semiconductors, are capable of emitting visible and ultraviolet light of various colors such as red, green, and blue owing to development of device materials and thin film growth techniques. These light emitting devices are also capable of emitting white light with high luminous efficacy through use of a fluorescent substance or color combination and have several advantages of low power consumption, semi-permanent lifespan, fast response speed, safety, and environmental friendliness, as compared to conventional light sources, such as, fluorescent lamps and incandescent lamps.

Accordingly, application of the light emitting devices has been extended to transmission modules of optical communication means, light emitting diode backlights to replace Cold Cathode Fluorescent Lamps (CCFLs) which serve as backlights of Liquid Crystal Display (LCD) apparatuses, white light emitting diode lighting apparatuses to replace fluorescent lamps or incandescent lamps, vehicle headlights, and traffic lights.

A molding part to protect a light emitting structure or wires may be disposed around a light emitting device and, when light passes through the molding part formed of material, such as silicon, light is refracted by the molding part and the molding part may serve as a primary lens.

However, when a light emitting device is used as a light source of a lighting apparatus, a secondary lens to adjust the emission path of light may be used and the above-described secondary lens is generally referred as a 'lens'.

A light path may be greatly changed according to materials of a lens, particularly, shapes of the lens, and, particularly, in the case of an application in which light emitted from a light source proceeds only in a specific direction, the shape of a lens is more important.

SUMMARY

Embodiments provide a lens which concentrates light emitted to the outside in one direction in a lighting apparatus having a light source, such as light emitting devices.

In one embodiment, a lens may include a first body having a first cavity; a second body configured to come in surface contact with the first body; and a plurality of protrusions disposed on the surface of the second body, wherein: at least a part of the plurality of protrusions overlaps the first body in the vertical direction, a plurality of patterns are disposed on the surface of a first protrusion disposed closest to the first body among the protrusions; and at least one of the patterns includes a first inclined part formed in a first direction and a second inclined part formed in a second direction opposite the first direction. The second inclined parts of the patterns may be disposed at an angle of 80° to 100° with respect to the bottom of the first body.

The first inclined parts of the patterns may be parallel with each other.

The first cavity may include a curved surface in the first direction and an inclined surface in the second direction.

The curved surface may include at least one discontinuous line.

At least one of the protrusions may be disposed corresponding to the inclined surface of the first cavity.

The first pattern may include n patterns, the height of the $n^{th}$ pattern may be higher than the height of the $(n-1)^{th}$ pattern, the height of a second protrusion may be lower than the height of the $n^{th}$ pattern and higher than the height of the $(n-1)^{th}$ pattern, and n may be an integral number of 2 or more.

The height of a contact point between the $(n+1)^{th}$ pattern and the $n^{th}$ pattern may be higher than the height of a contact point between the $n^{th}$ pattern and $(n-1)^{th}$ pattern and n may be an integral number of 2 or more.

The height of a contact point between the second protrusion and the first protrusion may be lower than the height of a contact point between the first pattern and the second pattern.

The width of the $n^{th}$ pattern in a third direction may be greater than the width of the $(n-1)^{th}$ pattern, the third direction may be perpendicular to the first direction and n may be an integral number of 2 or more.

The second protrusion may include a third inclined part formed in the first direction and a fourth inclined part formed in the second direction.

The fourth inclined part may be parallel with the second inclined parts of the patterns.

The lens may further include a second cavity formed within the second body.

The second cavity may include an inclined surface formed in the first direction and an inclined surface formed in the second direction.

In another embodiment, a lens includes a first body having a first cavity, a second body configured to come in surface contact with the first body, and a first protrusion and a second protrusion disposed on the surface of the second body, wherein at least a part of the first protrusion and the second protrusion overlaps the first body in the vertical direction, and the first protrusion disposed close to the first body includes n patterns, the height of the $n^{th}$ pattern is higher than the height of the $(n-1)^{th}$ pattern, the height of the second protrusion is lower than the height of the $n^{th}$ pattern and higher than the height of the $(n-1)^{th}$ pattern, and n is an integral number of 2 or more.

The height of a contact point between the $(n+1)^{th}$ pattern and the $n^{th}$ pattern may be higher than the height of a contact point between the $n^{th}$ pattern and $(n-1)^{th}$ pattern and n may be an integral number of 2 or more.

The height of a contact point between the second protrusion and the first protrusion may be lower than the height of a contact point between the first pattern and the second pattern.

In yet another embodiment, a light emitting device module includes a lens including a first body having a first cavity, a second body configured to come in surface contact with the first body, and a plurality of protrusions disposed on the surface of the second, a plurality of patterns disposed on the surface of a first protrusion disposed closest to the first body and at least one of the patterns including a first inclined part formed in a first direction and a second inclined part formed in a second direction opposite the first direction, and a light emitting device package at least partially inserted into the first cavity of the lens, wherein a plurality of light emitting devices is disposed on a substrate of the light emitting device package and at least a part of the light emitting devices is inserted into the first cavity.

At least a part of the light emitting devices may overlap the protrusion in the vertical direction.

At least a part of the light emitting devices may overlap a region, in which an inclined surface and a curved surface within the cavity contact each other, in the vertical direction.

BRIEF DESCRIPTION OF THE DRAWINGS

Arrangements and embodiments may be described in detail with reference to the following drawings in which like reference numerals refer to like elements and wherein.

DESCRIPTION OF SPECIFIC EMBODIMENTS

Hereinafter, embodiments will be described with reference to the annexed drawings.

In the following description of the embodiments, it will be understood that, when each element is referred to as being formed "on" or "under" the other element, it can be directly "on" or "under" the other element or be indirectly formed with one or more intervening elements therebetween. In addition, it will also be understood that "on" or "under" the element may mean an upward direction and a downward direction of the element.

Figure 1:
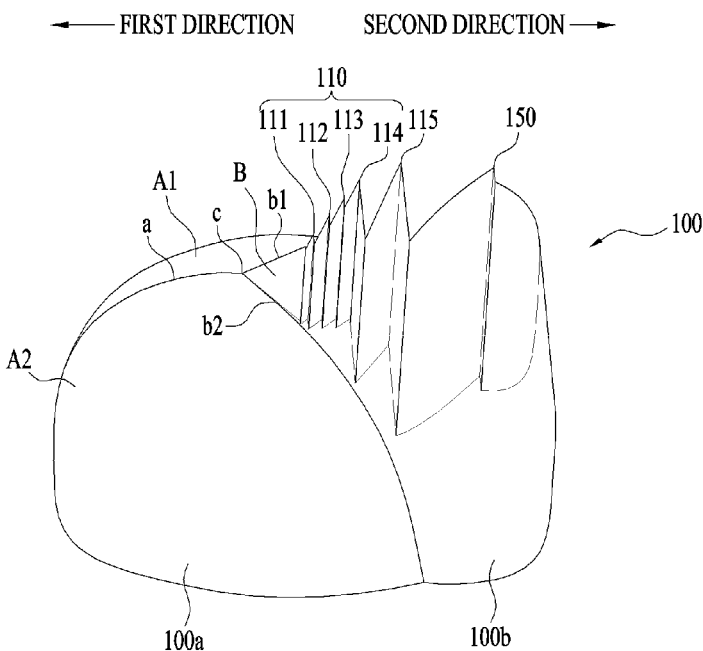
FIG. 1 is a perspective view of a lens in accordance with one embodiment.

FIG. 1 is a perspective view of a lens in accordance with one embodiment.

A lens 100 in accordance with this embodiment may include a first body 100a and a second body 100b, coming in surface contact with each other. The first body 100a and the second body 100b may be formed of the same material, for example, silicon, and formed integrally with each other.

The surface of the first body 100a includes two curved surfaces A1 and A2 disposed opposite each other, and the two curved surfaces A1 and A2 are divided by a boundary line a. One side of each of the two curved surfaces A1 and A2 may contact the above-described boundary line a and the other side of each of the two curved surfaces A1 and A2 may contact another boundary line b1 or b2. Further, another curved surface B is disposed between the above-described boundary lines b1 and b2. Such a curved surface B may form a part of the second body 100b.

The above-described three curved surfaces A1, A2 and B converge on one contact point c, and the contact point c is located at the highest region of the three curved surfaces A1, A2 and B but is located at a height lower than protrusions 110, 115 and 150 which will be described later.

A first protrusion 110 is disposed on the second body 100b close to the above-described curved surface B. The first protrusion 110 may include a plurality of patterns, for example, four patterns 111~114 in this embodiment, and a second protrusion 115 may be disposed close to the first protrusion 110.

Further, a third protrusion 150 may be disposed on the surface of the second body 110b close to the above-described second protrusion 115. The third protrusion 150 may include a fifth inclined part 150a and a sixth inclined part 150b, which will be described later.

The number of the first protrusion 110, the second protrusion 115 and the third protrusion 150 is not limited thereto.

Figure 2A:
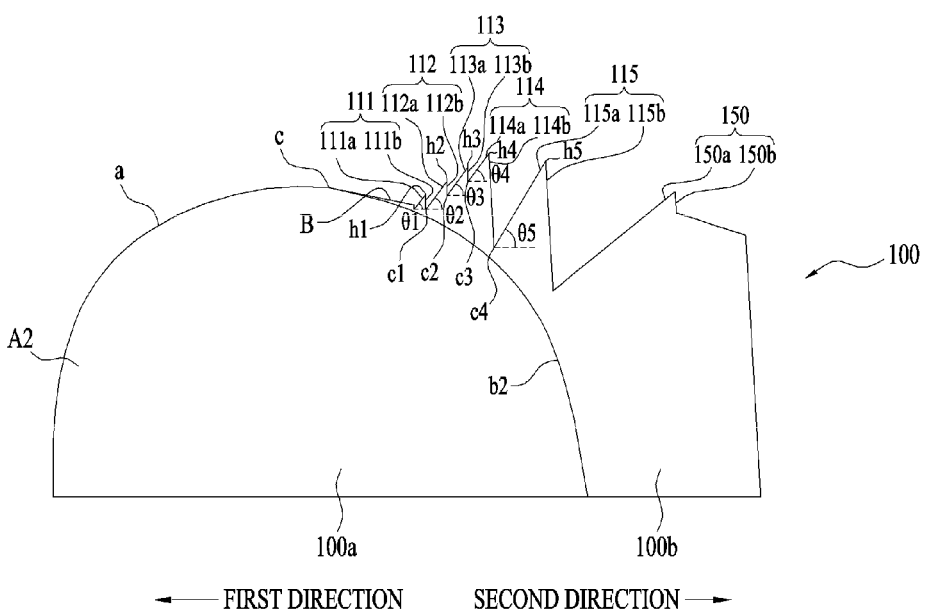
FIGS. 2A and 2B are cross-sectional views of the lens of FIG. 1.
Figure 2B:
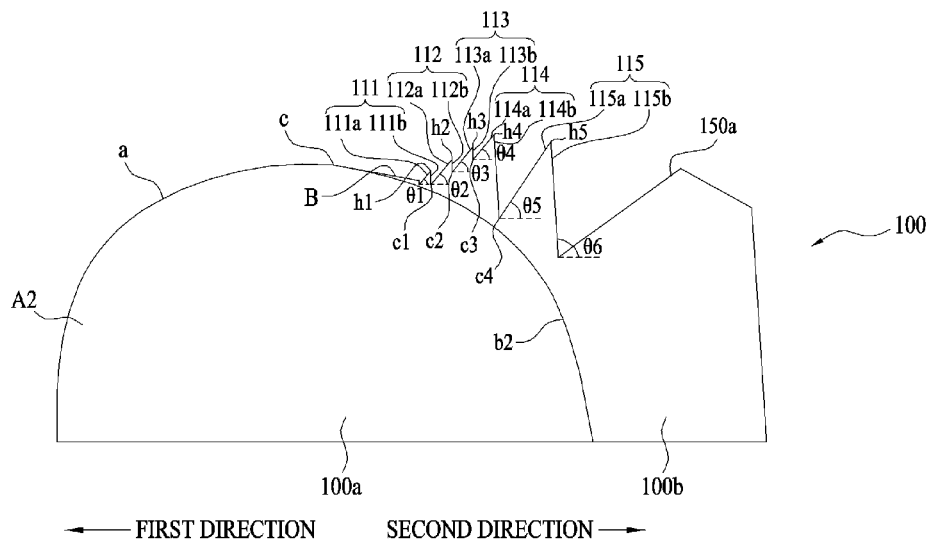

FIGS. 2A and 2B are cross-sectional views of the lens of FIG. 1.

In FIGS. 1 and 2A, the direction of the first body 100a and the direction of the second body 110b may be respectively referred to as a first direction and a second direction. FIG. 2A illustrates one curved surface A2 of the first body 100a and four patterns 111~114 close to the curved surface B.

Each of the respective patterns 111 and 114 and the second protrusion 115 includes two surfaces. That is, the patterns 111 and 114 and the second protrusion 115 respectively include first inclined parts 111a~114a and a third inclined part 115a formed in the first direction and second inclined parts 111b~114b formed in the second direction opposite the first inclined parts 111a~114a and a fourth inclined part 115b formed in the second direction opposite the third inclined part 115a.

The first pattern 111 may include one first inclined part 111a and one second inclined part 111b, the second pattern 112 may include one first inclined part 112a and one second inclined part 112b, the third pattern 113 may include one first inclined part 113a and one second inclined part 113b, the fourth pattern 114 may include one first inclined part 114a and one second inclined part 114b, and the second protrusion 115 disposed close to the first protrusion 110 may include the third inclined part 115a and the fourth inclined part 115b.

The above-described second inclined parts 111b~114b and fourth inclined part 115b may totally reflect light emitted from a light source, such as light emitting devices, and guide the totally reflected light in the first direction of FIG. 1. The first inclined parts 111a-114a and the third inclined part 115a may refract the totally reflected light. Although not shown in the drawings, convex and concave structures may be formed on the first inclined parts 111a, 112a, 113a and 114a and the third inclined part 115a of the second protrusion 115, thus improving light refraction effects. Further, in addition to the above-described inclined parts, other inclined parts may be further formed on the lens and the disclosure is not limited thereto.

The above-described second inclined parts 111b~114b and fourth inclined part 115b may totally reflect light incident from light emitting devices, which will be described later, and the first inclined parts 111a-114a and the third inclined part 115a may refract light reflected by the second inclined parts 111b-114b and the fourth inclined part 115b or other light so as to guide the light in the first direction.

The first inclined parts 111a-114a and the third inclined part 115a may have predetermined angles θ1~θ5 with respect to the bottom of the first body 100a and the predetermined angles θ1~θ5 formed between the first inclined parts 111a-114a and the third inclined part 115a and the bottom of the first body 100a may be 40 degrees to 70 degrees. For example, the predetermined angles θ1~θ5 formed between the first inclined parts 111a~114a and the third inclined part 115a and the bottom of the first body 100a may be the same and first inclined parts 111a~114a and the third inclined part 115a may be parallel with each other, but the disclosure is not limited thereto. That is, the predetermined angles θ1~θ5 formed between the first inclined parts 111a~114a and third inclined part 115a and the bottom of the first body 100a may be different or at least two of the predetermined angles θ1~θ5 may be the same.

If the angles θ1~θ5 formed between the first inclined parts 111a~114a and third inclined part 115a and the bottom of the first body 100a are less than 40 degrees, light emitted from the light emitting devices, which will be described later, may be transmitted mainly to the upward direction of the lens (in the upward direction of the left portion of FIG. 2A). On the other hand, if the angles θ1~θ5 formed between the first inclined parts 111a~114a and third inclined part 115a and the bottom of the first body 100a exceed 70 degrees, light may be transmitted mainly to the downward direction of the lens (in the downward direction of the left portion of FIG. 2A).

The second inclined parts 111b~114b of the first to fourth patterns 111~114 and the fourth inclined part 115b of the second protrusion 115 may be arranged at a designated angle with respect to the bottom of the first body 100a and the second inclined parts 111b~114b and the fourth inclined part 115b may be parallel with each other, but the disclosure is not limited thereto. For example, the second inclined parts 111b~114b of the first to fourth patterns 111~114 and the fourth inclined part 115b of the second protrusion 115 may be disposed vertically to the bottom of the first body 100a or disposed at an angle within the range of ±10° of a right angle with respect to the bottom of the first body 100a, i.e., an angle within the range of 80° to 100°.

If the angle θ6 between the fourth inclined part 115b and the bottom of the first body 100a is less than 80°, light emitted from the light emitting devices, which will be described later, may travel slantingly in the upward direction of the lens (in the upward direction of the left portion of FIG. 2A), Further, if the angle θ6 between the fourth inclined part 115b and the bottom of the first body 100a exceeds 100°, the light may travel slantingly in the downward direction of the lens (in the downward direction of the left portion of FIG. 2A).

Here, although FIG. 2B illustrates only the angle θ6 between the fourth inclined part 115b and the bottom of the first body 100a, the angles between the second inclined parts 111b~114b and the bottom of the first body 100a may be the same as the angle θ6 between the fourth inclined part 115b and the bottom of the first body 100a.

The angles between the second inclined parts 111b~114b and fourth inclined part 115b and the bottom of the first body 100a may be the same or different or at least two of the angles between the second inclined parts 111b~114b and fourth inclined part 115b and the bottom of the first body 100a may be the same, but the disclosure is not limited thereto.

If the first protrusion 110 includes n patterns, the height of the $n^{th}$ pattern may be higher than the height of the $(n-1)^{th}$ pattern, the height of the second protrusion 115 may be lower than the height of the $n^{th}$ pattern and higher than the height of the $(n-1)^{th}$ pattern, and n may be an integral number of 2 or more.

That is, in this embodiment, the heights of the four patterns 111~114 are gradually increased in a direction from the height h1 of the first pattern 111 to the height h4 of the fourth pattern 114. Further, the height h5 of the second protrusion 115 may be lower than the height h4 of the fourth pattern 114 and higher than the height h3 of the third pattern 113. Here, the above-described 'height' may be a height with respect to the bottom of the first body 100a.

Further, the height of a contact point between the $(n+1)^{th}$ pattern and the $n^{th}$ pattern may be higher than the height of a contact point between the $n^{th}$ pattern and the $1)^{th}$ pattern and n may be an integral number of 2 or more. Further, the height of a contact point between the second protrusion 115 and the first protrusion 110 may be lower than the height of a contact point between the first pattern 111 and the second pattern 112.

That is, on the assumption that the contact point between the first pattern 111 and the second pattern 112 is defined as c1, a contact point between the second pattern 112 and the third pattern 113 is defined as c2, a contact point between the third pattern 113 and the fourth pattern 114 is defined as c3, and a contact point between the fourth pattern 114 and the second protrusion 115 is defined as c4, the contact point c2 between the second pattern 112 and the third pattern 113 may be arranged at a height higher than the contact point c1 between the first pattern 111 and the second pattern 112, the contact point c3 between the third pattern 113 and the fourth pattern 114 may be arranged at a height higher than the contact point c2 between the second pattern 112 and the third pattern 113, and the contact point c4 between the fourth pattern 114 and the second protrusion 115 may be arranged at a height lower than the contact point c1 between the first pattern 111 and the second pattern 112.

Since the number of the above-described first to fourth patterns 111~114 and second protrusion 115 may vary according to design and the heights of the patterns 111~114 or the heights of the protrusions 110, 115 and 150 and the heights of the respective contact points c1~c4 may vary according to design, the disclosure is not limited thereto. For example, while the number of the first to fourth patterns 111~114 may decrease or increase, the second protrusion 115 having the same shape may be disposed, but the disclosure is not limited thereto.

The embodiment shown in FIG. 2B is the same as the embodiment shown in FIG. 2A except that the sixth inclined part 150b of the third protrusion 150 is omitted in FIG. 2A.

Figure 3:
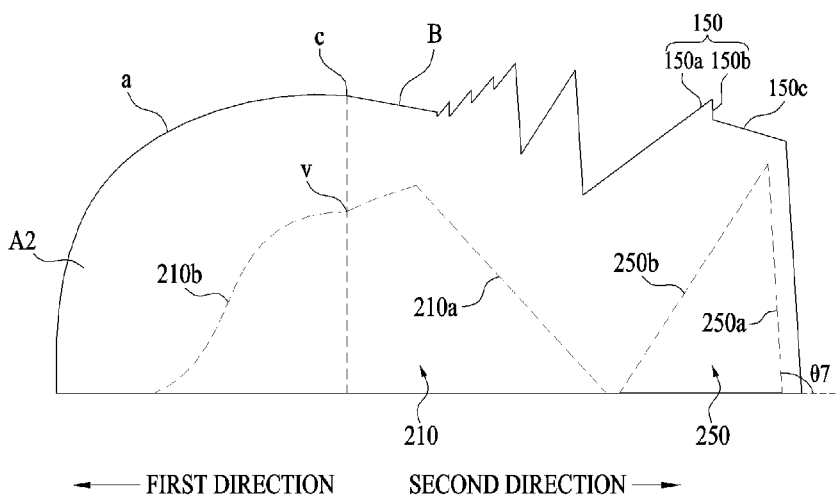
FIG. 3 is a view illustrating a first cavity and a second cavity within the lens of FIG. 1.

The second inclined parts 111b~114b and the fourth inclined part 115b of the above-described first to fourth patterns 111~114 of the first protrusion 110 and the second protrusion 115 may totally reflect light emitted from the light source, such as the light emitting devices which will be described later, and the first inclined parts 111a~114a and the third inclined part 115a may refract the totally reflected light and transmit the light in the first direction. FIG. 3 is a view illustrating a first cavity and a second cavity within the lens of FIG. 1.

In FIG. 3, the outlines of the first body and the second body of the lens are shown by a solid line and a first cavity 210 and a second cavity 250 within the lens are shown by a dotted line.

The cross-section of the first cavity 210 includes an inclined surface 210a formed in the second direction and a curved surface 210b formed in the first direction, the curved surface 210b may have at least one discontinuous line v, and the discontinuous line v may overlap the above-described one contact point c in the vertical direction. The curved surface 210b has a curvature, the curvature of the curved surface 210b may be changed, and the discontinuous line v may be a section where the curvature of the curved surface 210b is discontinuously changed, for example, an inflection point.

The first cavity 210 and the second cavity 250 may be filled with air. The first cavity 210 is a region which is disposed on the light emitting devices, which will be described later, or into which at least a part of the light emitting devices is inserted, and the second cavity 250 may be formed for an injection molding process of the lens 100 formed of silicon and improve light extraction efficiency. Parts of the first cavity 210 may be disposed within the first body 100a and the second body 100b and the second cavity may be disposed within the second body 100b.

The second cavity 250 may include an inclined surface 250a formed in the second direction and an inclined surface 250b formed in the first direction. The inclined surface 250b may reflect light emitted from the light emitting devices, which will be described later, and guide the light in the direction of the above-described third protrusion 150.

The inclined surface 250b in the first direction may be arranged at a designated angle with respect to the bottom of the first body 100a. As will be described later, the inclination angle of the inclined surface 250b may be formed such that light reflected by the inclined surface 250b proceeds toward the third protrusion 150, particularly, in the direction of a seventh inclined part 150c.

Figure 8A:
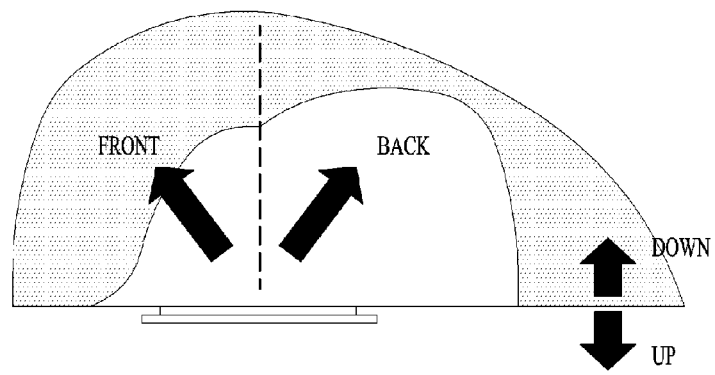
FIGS. 8A to 8C are views illustrating functions of protrusions and patterns disposed on a lens.
Figure 8B:
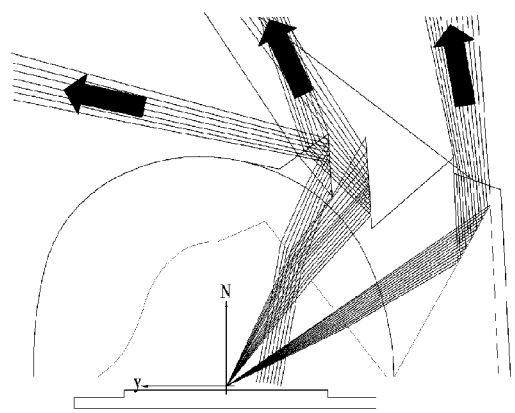

With reference to FIG. 3, the third protrusion 150 may further include the seventh inclined part 150c in addition to the fifth inclined part 150a and the sixth inclined part 150b and light reflected by the inclined surface 250b in the first direction may be refracted by the seventh inclined part 150c, as exemplarily shown in FIG. 8B. Light reflected by the inclined surface 250b in the first direction may be refracted by the seventh inclined part 150c and a part of the light may be reflected again by the sixth inclined part 150b. As described above with reference to FIG. 2B, the sixth inclined part 150b may be omitted and the path of light refracted by the sixth inclined part 150b may be further adjusted by the seventh inclined part 150c. The inclined surface 250a in the second direction may be arranged at a designated angle θ7 with respect to the bottom of the second body and the designated angle θ7 may be within the range of 80° to 100°, for example, a right angle.

Figure 4:
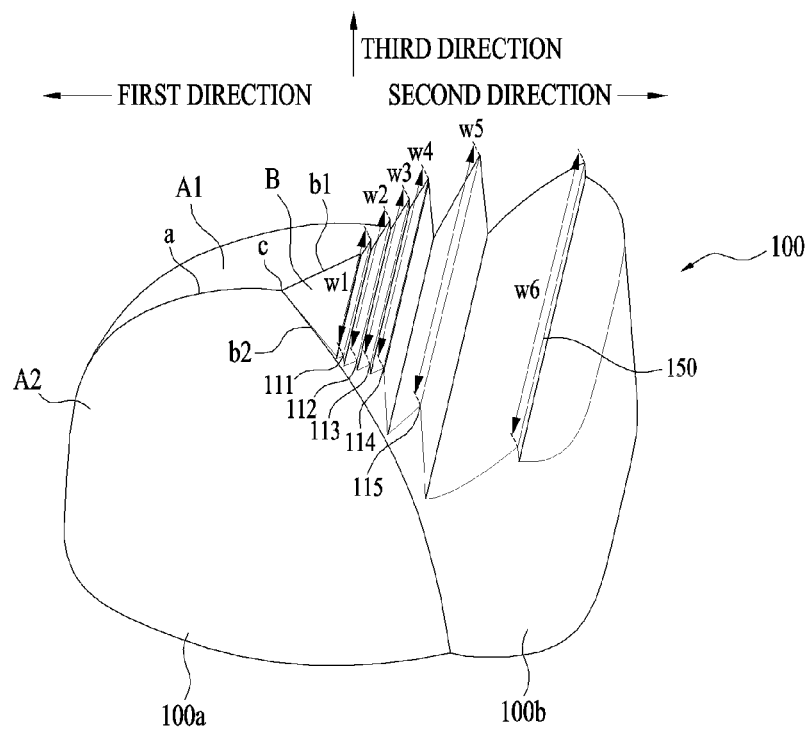
FIG. 4 is a view illustrating widths of patterns within a first protrusion and widths of a second protrusion and a third protrusion of the lens of FIG. 1.

FIG. 4 is a view illustrating widths of the patterns 111~114 of the first protrusion 110 and widths of the second protrusion 115 and the third protrusion 150 of the lens 100 of FIG. 1.

The width of the $n^{th}$ pattern of the first protrusion 110 in a third direction is greater than the width of the $(n-1)^{th}$ pattern. Here, the third direction may be perpendicular to the first direction and n may be an integral number of 2 or more.

That is, in this embodiment, the width w2 of the second pattern 112 may be greater than the width w1 of the first pattern, the width w3 of the third pattern 113 may be greater than the width w2 of the second pattern 112, the width w4 of the fourth pattern 114 may be greater than the width w3 of the third pattern 113, and the width w5 of the second protrusion 115 may be greater than the width w4 of the fourth pattern 114.

Further, the width w6 of the third protrusion 150 may be greater than the width w5 of the second protrusion 115. That is, the widths w1~w6 of the four patterns 111~114, the second protrusion 115 and the third protrusion 150 may increase in the second direction. That is, since the third protrusion 150 is disposed at the farthest position from the light source, such as the light emitting devices, and the second protrusion 115 is disposed at a relatively far position from the light source, as compared to the four patterns 111~114, the widths of the second protrusion 115 and the third protrusion 150, upon which light emitted from the light source, such as the light emitting devices, is relatively widely incident, may be greater than the widths w1~w4 of the four patterns 111~114.

Figure 5:
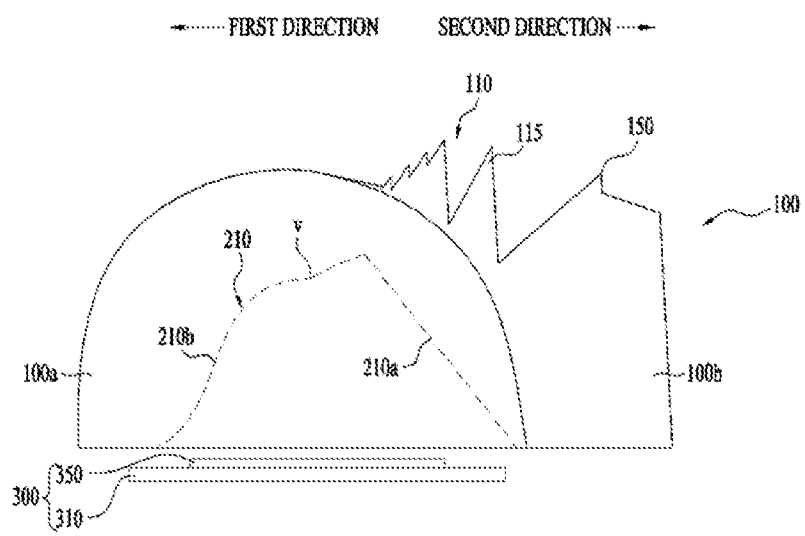
FIG. 5 is a view illustrating a light emitting device module including a lens in accordance with one embodiment.

FIG. 5 is a view illustrating a light emitting device module including a lens in accordance with one embodiment.

A light emitting device package 300 including a substrate 310 and light emitting devices 350 is disposed below a first cavity 210 within a first body 100a of a lens 100. At least a part of the light emitting devices 350 of the light emitting device package 300 may be disposed below the first cavity 210 or inserted into the first cavity 210.

The light emitting devices 350 overlap a region, in which the inclined surface 210a and the curved surface 210b of the first cavity 210 contact each other, in the vertical direction.

The first protrusion 110 may correspond to the first inclined surface 210a of the first cavity 210, i.e., overlap the first inclined surface 210a in the vertical direction.

A partial region of the light emitting devices 350 serving as a light source may overlap the first protrusion 110 in the vertical direction. Thereby, light emitted from the light emitting devices 350 in the first direction may be emitted through the first body 100a and the second body 100b, and light emitted from the light emitting devices 350 in the second direction may be reflected and refracted in the first direction by the first protrusion 110, the second protrusion 115, the third protrusion 150, the first cavity 210 and the second cavity 250.

Figure 6:
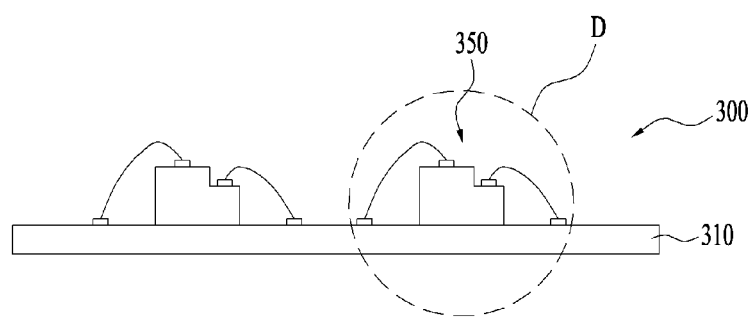
FIGS. 6 and 7 are views illustrating a light emitting device of FIG. 5.
Figure 7:
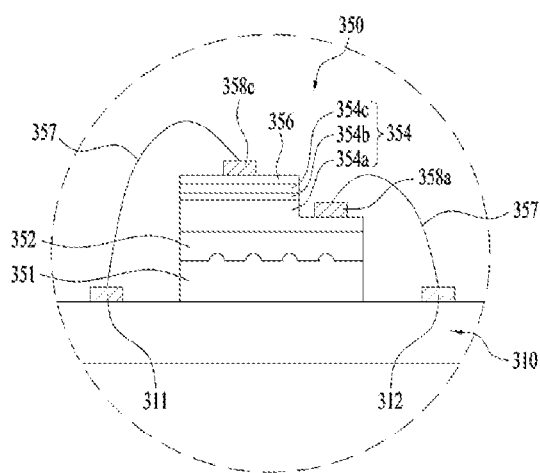

FIGS. 6 and 7 are views illustrating the light emitting device of FIG. 5.

A plurality of light emitting devices 350 is disposed on the substrate 310 and the respective light emitting devices 350 may be disposed, for example, in a chip on board (COB) type.

The substrate 310 may be a printed circuit board, a metal PCB, a flexible PCB (FPCB) or an FR-4. A first conductive layer 311 and a second conductive layer 312 on the substrate 300 may be conductibly connected to a first electrode 358a and a second electrode 358c of each of the light emitting devices 350.

The light emitting device 350 may include a substrate 351, a buffer layer 352 disposed on the substrate 351 and a light emitting structure 354 disposed on the buffer layer 352, the light emitting structure 354 may include a first conductivity-type semiconductor layer 354a, an active layer 354b and a second conductivity-type semiconductor layer 354c, and the first electrode 358a and the second electrode 358c may be disposed on the first conductivity-type semiconductor layer 354a and the second conductivity-type semiconductor layer 354c.

The substrate 351 may be formed of a material proper for growth of a semiconductor material or a carrier wafer, be formed of a material having excellent thermal conductivity, or include a conductive substrate or an insulating substrate.

For example, the substrate 351 may be formed of at least one of sapphire (Al$_2$O$_3$), SiO$_2$, SiC, Si, GaAs, GaN, ZnO, GaP, InP, Ge and Ga$_2$O$_3$.

When the substrate 351 is formed of sapphire and the light emitting structure 354 including GaN or AlGaN is disposed on the substrate 351, lattice mismatch between GaN or AlGaN and sapphire is great and a difference in coefficients of thermal expansion therebetween is great and, thus, dislocation causing lowering of crystallinity, melt-back, cracks, pits, surface morphology defects and the like may occur. Therefore, the buffer layer 352 formed of AlN may be formed.

The first conductivity-type semiconductor layer 354a may be formed of a compound semiconductor, i.e., a group III-V or group II-VI compound semiconductor, and be doped with a first conductivity-type dopant. The first conductivity-type semiconductor layer 354a may be formed of a semiconductor material having a composition of Al$_x$In$_y$Ga$_{1-x-y}$N (0≤x≤1, 0≤y≤1, 0≤x+y≤1), for example, formed of one or more of AlGaN, GaN, InAlGaN, AlGaAs, GaP, GaAs, GaAsP and AlGaInP.

If the first conductivity-type semiconductor layer 354a is an n-type semiconductor layer, the first conductivity-type dopant may be an n-type dopant, such as Si, Ge, Sn, Se, or Te. The first conductivity-type semiconductor layer 354a may be formed to have a single layered structure or a multi-layered structure, but the disclosure is not limited thereto.

The active layer 354b may be disposed on the upper surface of the first conductivity-type semiconductor layer 354a and include any one of a double hetero structure, a multi-well structure, a single quantum well structure, multi-quantum well (MQW) structure, a quantum dot structure and a quantum wire structure.

The active layer 354b may be formed of a compound semiconductor, for example, a group III-V compound semiconductor, and have a pair structure of a well layer having a composition of In$_x$Al$_y$Ga$_{1-x-y}$N (0≤x≤1, 0≤y≤1, 0≤x+y≤1) and a barrier layer having a composition of In$_x$Al$_y$Ga$_{1-x-y}$N (0≤x≤1, 0≤y≤1, 0≤x+y≤1), for example, one or more of AlGaN/AlGaN, InGaN/GaN, InGaN/InGaN, AlGaN/GaN, InAlGaN/GaN, GaAs(InGaAs)/AlGaAs and GaP(InGaP)/AlGaP, but the disclosure is not limited thereto. The well layer may be formed of a material having a lower energy band gap than the energy band gap of the barrier layer.

The second conductivity-type semiconductor layer 354c may be formed on the surface of the active layer 354b. The second conductivity-type semiconductor layer 354c may be formed of a compound semiconductor, i.e., a group III-V or group II-VI compound semiconductor, and be doped with a second conductivity-type dopant. The second conductivity-type semiconductor layer 354c may be formed of a semiconductor having a composition of In$_x$Al$_y$Ga$_{1-x-y}$N (0≤x≤1, 0≤y≤1, 0≤x+y≤1), for example, formed of one or more of AlGaN, GaN, AlInN, AlGaAs, GaP, GaAs, GaAsP and AlGaInP.

If the second conductivity-type semiconductor layer 354c is a p-type semiconductor layer, the second conductivity-type dopant may be a p-type dopant, such as Mg, Zn, Ca, Sr or Ba. The second conductivity-type semiconductor layer 354c may be formed to have a single layered structure or a multilayered structure, but the disclosure is not limited thereto. Convex and concave structures (not shown) may be formed on the second conductivity-type semiconductor layer 354c to improve light extraction efficiency.

A light-transmitting conductive layer 356 formed of indium tin oxide (ITO) may be formed on the second conductivity-type semiconductor layer 354c to improve current spreading effects from the second electrode 358c to the second conductivity-type semiconductor layer 354c.

By mesa etching the second conductivity-type semiconductor layer 354c, the active layer 354b and a part of the first conductivity-type semiconductor layer 354a, the first conductivity-type semiconductor layer 354a may be exposed to assure a region in which the first electrode 358a will be formed.

The first electrode 358a and the second electrode 358c are disposed on the first conductivity-type semiconductor layer 354a and the second conductivity-type semiconductor layer 354c. The first electrode 358a and the second electrode 358c may be formed in a single layered structure or a multilayered structure including at least one of aluminum (Al), titanium (Ti), chrome (Cr), nickel (Ni), copper (Cu) and gold (Au).

The first electrode 358a and the second electrode 358c may be conductibly connected to the first conductive layer 311 and the second conductive layer 312 on the substrate 310 through wires 357, respectively.

Although not shown in the drawings, a passivation layer may be formed around the light emitting structure 354. The passivation layer may be formed of an insulating material, particularly, an oxide or a nitride, and, more particularly, a silicon oxide (SiO$_2$) layer, an oxynitride layer or an aluminum oxide layer. Further, convex and concave structures may be formed on the passivation layer to improve light extraction efficiency.

Figure 8C:
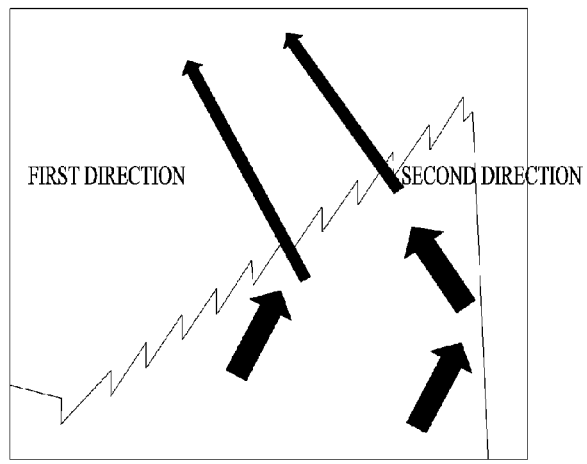

FIGS. 8A to 8C are views illustrating functions of protrusions and patterns disposed on a lens.

In FIG. 8A, when no protrusion is formed on a lens, light emitted from a light source, such as light emitting devices, uniformly proceeds forward and backward. In FIG. 8B, light proceeds mainly leftward, i.e., in the above-described first direction, due to the functions of protrusions and patterns formed on a lens. In FIG. 8C, light may be further refracted in the first direction due to the functions of patterns formed on a first protrusion. In FIG. 8C, a larger number of patterns than the number of the patterns in accordance with the above-described embodiment are disposed on the first protrusion.

In FIG. 8B, among light emitted from a light source, such as light emitting devices, light proceeding in the direction of the inclined surface 210a in the second direction within the first cavity 210 is refracted by the inclined surface 210a in the second direction, is totally reflected by the second inclined surfaces 111b~114b and the fourth inclined surface 115b of the first and second protrusions 110 and 115, and is then refracted by the first inclined surfaces 111a~114a and the third inclined surface 115a. Further, a part of light may be totally reflected by the inclined surface 250b in the first direction of the second cavity 250. Here, the totally reflected light may be refracted by the above-described seventh inclined surface 150c.

The first cavity serves to guide light in the direction of the protrusions and the second cavity, the protrusions serve to guide light through total reflection using the second inclined surfaces and the fourth inclined surface and refraction using the first inclined surfaces and the third inclined surface, and the second cavity is formed for an injection molding process of the lens but serves to change the path of light.

Figure 9A:
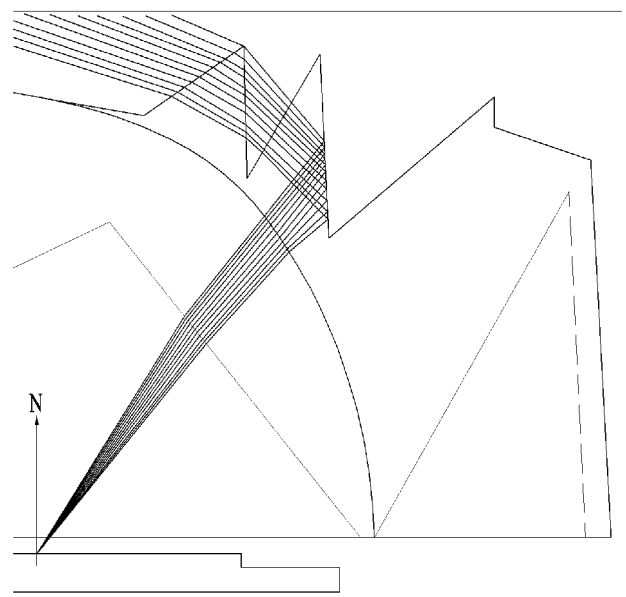
FIGS. 9A and 9B are views illustrating functions of patterns disposed on a first protrusion.
Figure 9B:
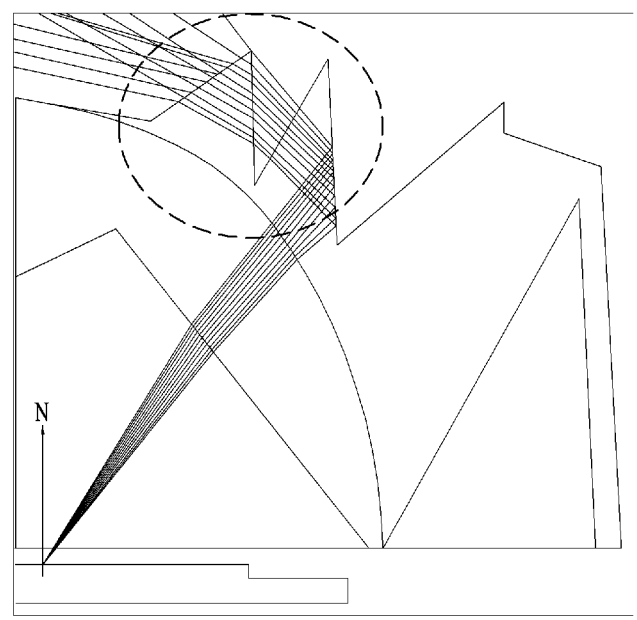

FIGS. 9A and 9B are views illustrating functions of patterns disposed on a first protrusion.

In FIG. 9A, no pattern is disposed on a first protrusion 110 and, in FIG. 9B, patterns are disposed on a first protrusion 110. In the case of the embodiment shown in FIG. 9B, light is scattered by the patterns and may thus travel at a wide angle, as compared to the embodiment shown in FIG. 9A.

Figure 10A:
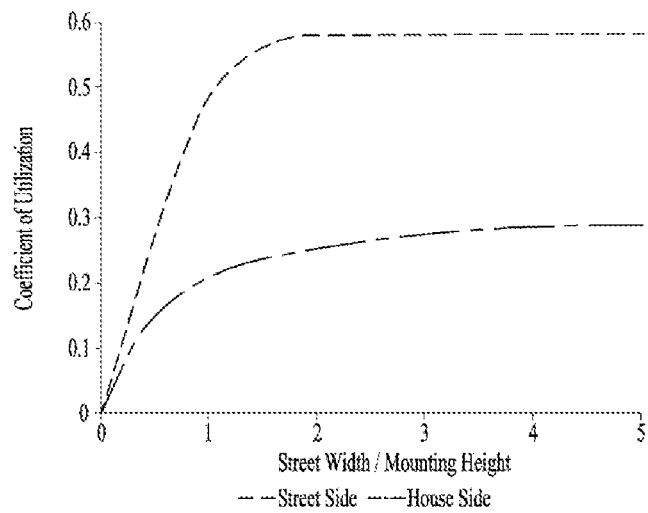
FIGS. 10A and 10B are graphs illustrating light distribution of a conventional lens.
Figure 10B:
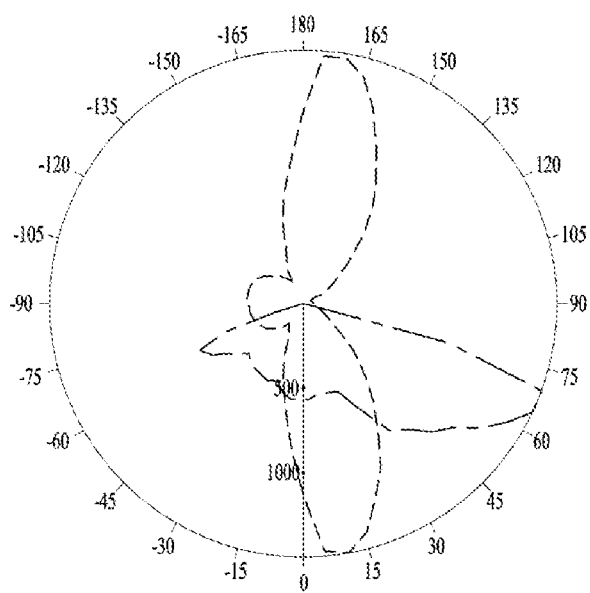
Figure 11A:
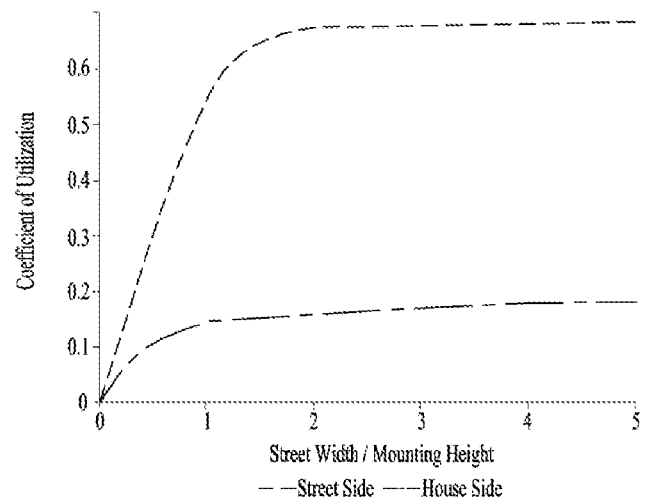
FIGS. 11A and 11B are graphs illustrating light distribution of a lens in accordance with one embodiment.
Figure 11B:
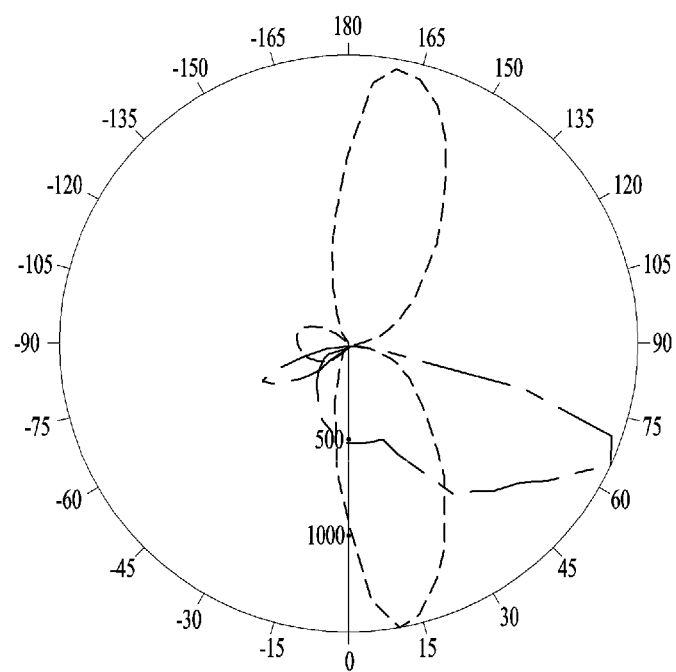

FIGS. 10A and 10B are graphs illustrating light distribution of a conventional lens and FIGS. 11A and 11B are graphs illustrating light distribution of a lens in accordance with one embodiment.

In these graphs, red indicates the quantity of light proceeding in the first direction (in a direction of the street side) and blue indicates the quantity of light proceeding in the second direction (in a direction of the house side).

It may be understood that, if the lens in accordance with the embodiment is used, the quantity of light proceeding in the second direction is much smaller than when the conventional lens is used. Therefore, a light emitting device module including the lens in accordance with the above-described embodiments may transmit light in the first direction with reference to FIG. 1 and other figures and, on the assumption that, when the light emitting device module is used in a lighting apparatus on a road, the first direction is defined as a direction of the street side and the second direction is defined as a direction of the house side, refract a larger quantity of light in the direction of the street side and thus reduce a quantity of light proceeding in the direction of the house side.

As apparent from the above description, a lens of in accordance with embodiments may increase a quantity of light proceeding in a first direction, as compared to a quantity of light proceeding in a second direction, and, on the assumption that, when a light emitting device module including the lens is used in a lighting apparatus on a road, the first direction is defined as a direction of the street side and the second direction is defined as a direction of the house side, reduce a quantity of light proceeding in the direction of the house side.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lens comprising:
   a first body having a first cavity;
   a second body configured to come in surface contact with the first body; and
   a plurality of protrusions disposed on the surface of the second body, wherein:
   at least a part of the plurality of protrusions overlaps the first body in the vertical direction,
   a plurality of patterns are disposed on the surface of a first protrusion disposed closest to the first body among the protrusions; and
   at least one of the patterns includes a first inclined part formed in a first direction and a second inclined part formed in a second direction opposite the first direction.

2. The lens according to claim 1, wherein the second inclined parts of the patterns are disposed at an angle of 80° to 100° with respect to the bottom of the first body.

3. The lens according to claim 1, wherein the first inclined parts of the patterns are parallel with each other.

4. The lens according to claim 1, wherein the width of the $n^{th}$ pattern in a third direction is greater than the width of the $(n-1)^{th}$ pattern, the third direction is perpendicular to the first direction and n is an integral number of 2 or more.

5. The lens according to claim 1, wherein a second protrusion includes a third inclined part formed in the first direction and a fourth inclined part formed in the second direction.

6. The lens according to claim 5, wherein the fourth inclined part is parallel with the second inclined parts of the patterns.

7. The lens according to claim 1, further comprising a second cavity formed within the second body.

8. The lens according to claim 7, wherein the second cavity includes an inclined surface formed in the first direction and an inclined surface formed in the second direction.

9. The lens according to claim 1, wherein the first cavity includes a curved surface in the first direction and an inclined surface in the second direction.

10. The lens according to claim 9, wherein the curved surface includes at least one discontinuous line.

11. The lens according to claim 9, wherein at least one of the protrusions is disposed corresponding to the inclined surface of the first cavity.

12. The lens according to claim 1, wherein the first pattern includes n patterns, the height of the $n^{th}$ pattern is higher than the height of the $(n-1)^{th}$ pattern, the height of a second protrusion is lower than the height of the $n^{th}$ pattern and higher than the height of the $(n-1)^{th}$ pattern, and n is an integral number of 2 or more.

13. The lens according to claim 12, wherein the height of a contact point between the $(n+1)^{th}$ pattern and the $n^{th}$ pattern is higher than the height of a contact point between the $n^{th}$ pattern and $(n-1)^{th}$ pattern and n is an integral number of 2 or more.

14. The lens according to claim 12, wherein the height of a contact point between the second protrusion and the first protrusion is lower than the height of a contact point between the first pattern and the second pattern.

15. A lens comprising:
   a first body having a first cavity;
   a second body configured to come in surface contact with the first body; and
   a first protrusion and a second protrusion disposed on the surface of the second body, wherein:
   at least a part of the first protrusion and the second protrusion overlaps the first body in the vertical direction, and the first protrusion disposed close to the first body includes n patterns, the height of the $n^{th}$ pattern is higher than the height of the $(n-1)^{th}$ pattern, the height of the second protrusion is lower than the height of the $n^{th}$ pattern and higher than the height of the $(n-1)^{th}$ pattern, and n is an integral number of 2 or more.

16. The lens according to claim 15, wherein the height of a contact point between the $(n+1)^{th}$ pattern and the $n^{th}$ pattern is higher than the height of a contact point between the $n^{th}$ pattern and $(n-1)^{th}$ pattern and n is an integral number of 2 or more.

17. The lens according to claim 15, wherein the height of a contact point between the second protrusion and the first protrusion is lower than the height of a contact point between the first pattern and the second pattern.

18. A light emitting device module comprising:
a lens including a first body having a first cavity, a second body configured to come in surface contact with the first body, and a plurality of protrusions disposed on the surface of the second body, a plurality of patterns are disposed on the surface of a first protrusion disposed closest to the first body and at least one of the patterns including a first inclined part formed in a first direction and a second inclined part formed in a second direction opposite the first direction; and
a light emitting device package including a plurality of light emitting devices is disposed on a substrate
at least a part of the light emitting devices is inserted into the first cavity.

19. The light emitting device module according to claim 18, wherein at least a part of the light emitting devices overlaps the protrusion in the vertical direction.

20. The light emitting device module according to claim 19, wherein at least a part of the light emitting devices overlaps a region, in which an inclined surface and a curved surface within the cavity contact each other, in the vertical direction.

* * * * *